(12) United States Patent
Kemper et al.

(10) Patent No.: US 10,309,488 B2
(45) Date of Patent: Jun. 4, 2019

(54) ENERGY CHAIN DEVICE WITH AT LEAST ONE DRIVE DEVICE FOR LONG TRAVEL PATHS

(71) Applicant: TSUBAKI KABELSCHLEPP GMBH, Wenden-Gerlingen (DE)

(72) Inventors: Uwe Kemper, Kreuztal (DE); Jochen Bensberg, Hilchenbach (DE); Dirk Schöler, Wilnsdorf (DE)

(73) Assignee: Tsubaki Kabelschlepp GmbH, Wenden-Gerlingen (DE)

( * ) Notice: Subject to any disclaimer, the term of this patent is extended or adjusted under 35 U.S.C. 154(b) by 1017 days.

(21) Appl. No.: 14/654,750

(22) PCT Filed: Dec. 20, 2013

(86) PCT No.: PCT/EP2013/077589
§ 371 (c)(1),
(2) Date: Jun. 22, 2015

(87) PCT Pub. No.: WO2014/102170
PCT Pub. Date: Jul. 3, 2014

(65) Prior Publication Data
US 2015/0330479 A1 Nov. 19, 2015

(30) Foreign Application Priority Data
Dec. 24, 2012 (DE) .......................... 10 2012 113 082

(51) Int. Cl.
*F16G 13/16* (2006.01)
*G05B 15/02* (2006.01)
(Continued)

(52) U.S. Cl.
CPC .............. *F16G 13/16* (2013.01); *F16G 13/20* (2013.01); *G05B 15/02* (2013.01); *H02G 11/006* (2013.01); *H02G 3/0475* (2013.01)

(58) Field of Classification Search
CPC ......... F16G 13/16; F16G 13/20; G05B 15/02; H02G 11/006; H02G 3/0475
(Continued)

(56) References Cited

U.S. PATENT DOCUMENTS 7,388,154 B2 * 6/2008 Chen ...................... B41J 19/20
174/117 F
8,733,077 B2 * 5/2014 Garcia ................... F16G 13/16
248/49
(Continued)

FOREIGN PATENT DOCUMENTS

CN 1617986 A 5/2005
DE 69607502 T2 11/2000
(Continued)

*Primary Examiner* — David B Jones
(74) *Attorney, Agent, or Firm* — BainwoodHuang

(57) ABSTRACT

An energy chain device includes at least one energy chain for guiding lines, cables, hoses or the like between a fixed and a movable connection region so as to form a curved region between a moved strand and a stationary strand. Each energy chain has a number of links which are connected to one another in a flexible manner and are formed by link plates which are arranged parallel to one another and transverse webs which connect the link plates. The energy chain device further includes at least one drive device which is operatively connected to the moved strand, and a control unit which is connected to the drive device so as to transmit signals and is connectable so as to transmit signals to a control device of a device which is connectable to the movable connection region.

11 Claims, 4 Drawing Sheets

Figure 1:
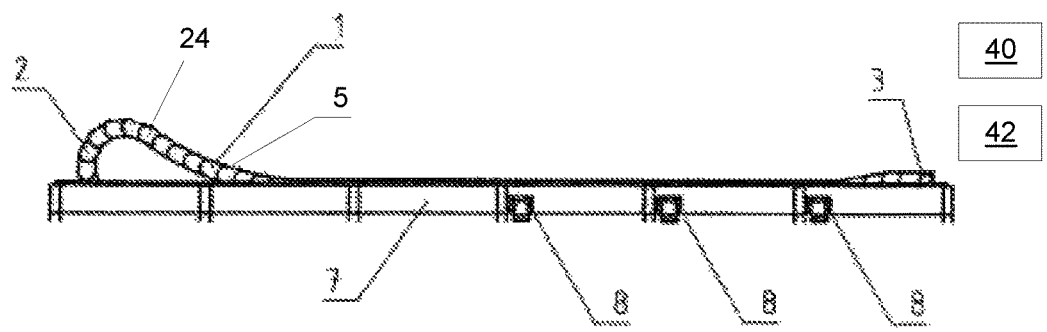

(51) Int. Cl.
*F16G 13/20* (2006.01)
*H02G 11/00* (2006.01)
*H02G 3/04* (2006.01)

(58) Field of Classification Search
USPC ............................................ 59/78.1
See application file for complete search history.

(56) References Cited

U.S. PATENT DOCUMENTS

| | | | |
|---|---|---|---|
| 9,222,546 B2 * | 12/2015 | Shoji | F16G 13/20 |
| 9,476,488 B2 * | 10/2016 | Fejer | E05F 11/06 |
| 9,482,313 B2 * | 11/2016 | Saji | F16G 13/20 |
| 2004/0011574 A1 | 1/2004 | Borgwarth et al. | |
| 2015/0135845 A1 * | 5/2015 | Hermey | F16G 13/16 |
| | | | 73/769 |

FOREIGN PATENT DOCUMENTS

| | | | |
|---|---|---|---|
| DE | 20305619 U1 | 8/2003 | |
| DE | 202004005858 U1 | 6/2004 | |
| DE | 102005041689 A1 | 3/2007 | |
| DE | 102006019218 A1 | 7/2007 | |
| DE | 202008001415 U1 | 6/2009 | |
| DE | 202011004784 U1 | 9/2011 | |
| DE | 202012001228 U1 | 4/2012 | |
| DE | 202012003907 U1 | 5/2012 | |
| DE | 202012103407 U1 | 11/2012 | |
| EP | 1584841 A1 | 10/2005 | |
| WO | 9957457 A1 | 11/1999 | |
| WO | 03060346 A1 | 7/2003 | |
| WO | 2006066812 A1 | 6/2006 | |
| WO | 2011134991 A1 | 11/2011 | |

* cited by examiner

ENERGY CHAIN DEVICE WITH AT LEAST ONE DRIVE DEVICE FOR LONG TRAVEL PATHS

The object of the invention relates to an energy chain device, in particular for long travel paths.

It is known that energy chains are used for guiding cables, lines, hoses and the like between a fixed and a movable connection point. Cables, lines, hoses and the like are guided to a consumer by means of an energy chain. In this connection, a consumer can be, for example, machine parts, cranes etc.

An energy chain is formed by a number of links which are connected together in a flexible manner. Each link comprises two link plates which are arranged parallel to one another and transverse webs which connect said link plates. The transverse webs can also be detachably connected to the link plates such that lines, cables or hoses can be moved into the channel that is formed by the links or can be replaced.

In the case of energy chains which are used for long travel paths, the problem arises that the friction forces between the upper strand and the lower strand can become very great. In dependence on the length of the travel path, a more operationally reliable development of the energy chain, which is used in gliding operation, i.e. the strands are developed so as to glide on one another, is hardly realizable. To reduce the friction forces it is known, for example, to arrange a carrying vehicle between an upper strand and a lower strand such that the upper strand is moved on the carrying vehicle.

One development of an energy chain which is suitable for longer travel paths is made known by WO 99/57457. In the case of said energy chain, slide rollers are provided for at least some of the chain links. The arrangement of the slide rollers makes it possible for the upper strand to move on the lower strand, the sliding rollers of the upper strand being supported on the lower strand.

The links of the energy chain are connected together in a flexible manner. On account of the wear of the flexible connection between the links, play is created between the links which, when looked at in summary, can result in a relevant change in length of the energy chain. On account of the different changes in length between the energy chain and the lines guided in the energy chain, it is possible for the energy chain with the lines to fail.

Proceeding from here, the objective underlying the present invention is to provide an energy chain device which is realized in a more operationally reliable manner.

Said object is achieved according to the invention by an energy chain device as disclosed herein and by an energy chain device as disclosed herein. Advantageous further developments and developments of the energy chain devices according to the invention are disclosed herein as well. The features stated individually herein are combinable with one another in an arbitrary, technologically meaningful manner and can be supplemented by explanatory situations in the description, further realization variants of the invention being indicated.

An energy chain device including at least one energy chain for guiding lines, cables, hoses or the like between a fixed and a movable connection region so as to form a curved region between a moved strand and a stationary strand is proposed according to one inventive concept. The energy chain is formed by a number of links which are connected to one another in a flexible manner. Each link is formed by link plates which are arranged parallel to one another and transverse webs which connect said link plates. The energy chain device comprises at least one drive device which is operatively connected to the moved strand. The energy chain device according to the invention further comprises a control unit. The control unit is connected to the at least one drive device so as to transmit signals. The control unit is further connectable so as to transmit signals to a control device of a device which is connectable to the movable connection region.

A greater degree of operational reliability of the energy chain device is achieved a result of said development according to the invention of the energy chain device. The forces which are necessary for moving the energy chain, in particular in the case of long travel paths, are applied at least in part by the at least one drive device. The energy chain is connected, for example, to an entrainment means (or structure) of the crane. The entrainment means is connected to the movable connection region of the energy chain. The force necessary for moving the energy chain is introduced into the energy chain not only by the crane and the entrainment means, but also by the drive device. The control unit, which is connected to the drive device and the control device of the device, which can be a crane for example, so as to transmit signals is provided for synchronous movement or for synchronous action between the movable connection region and the drive device. As a result of the energy chain being operatively connected by means of at least one drive device, the different ways of operating of the energy chain and of the lines arranged therein no longer result in the failure of the energy chain device. It is no longer absolutely necessary for the movable connection region to be coupled in a mechanically rigid manner with the entrainment means of a device as the forces that are necessary for moving the energy chain can be applied by the at least one drive device.

An energy chain device including at least one energy chain for guiding lines, cables, hoses or the like between a fixed and a movable connection region so as to form a curved region between a moved strand and a stationary strand is proposed according to another inventive concept. The energy chain is formed by a number of links which are connected to one another in a flexible manner. Each link comprises two link plates which are arranged parallel to one another and transverse webs which connect said link plates. The energy chain device comprises at least one drive device which is operatively connected to the moved strand. The energy chain device according to the invention further comprises a control unit which is connected to the drive device so as to transmit signals. There is provided at least one sensor unit which is connected to the control unit so as to transmit signals, wherein the sensor unit detects a movement of the movable connection region.

The operational reliability of the energy chain device is increased as a result of said development according to the invention of the energy chain device. In addition, it is possible to fit existing energy chain devices in retro without expenditure being particularly high and intervention in the control of the device being necessary. The sensor unit can be realized for example by pressure sensors. The pressure sensors supply a signal in dependence on whether a pulling or a pushing force is exerted onto the movable connection region by means of an entrainment means of a device. In dependence on this, the at least one drive device is actuated by means of the control unit.

According to an advantageous development of the energy chain device according to the invention, it is proposed that there is provided a coupling device, by means of which the movable connection region is detachably connectable to an entrainment means of a device. As a result of said development of the energy chain device according to the invention, fine positioning, for example of a crane or of a straddle carrier, is simplified as in the case of fine positioning, the travel path of the device, which can be a crane, is relatively small. An entrainment means can be decoupled from the movable connection region of the energy chain for this purpose. If the entrainment means is moved back or over a predefined section, the entrainment means is coupled with the movable connection region. This ensures that the lines, cables or hoses which area guided to the device are not exposed to any mechanical stress which can result in destruction of said lines, cables or hoses. It is also possible for the coupling device to be provided with a sensor system which detects the movement of the entrainment means and the coupling device is moved further, i.e. tracked, with the movable connection region without the entrainment means being coupled with the movable connection region. Thus, the coupling device is realized such that the movable connection region and the entrainment means are movable relative to one another inside a predefined section.

The drive unit can also be used as a braking unit. It is also possible for the drive device to be developed purely as a braking device. In addition to the at least one drive device, the energy chain device can also further comprise at least one braking device which is connected to the control unit. The forces onto the entrainment means are reduced in particular as a result of the braking action on the energy chain device such that the positioning of the entrainment means and consequently of the device can be simplified. In addition, a possibility of emergency braking is also provided in this manner in order to stop the moved strand in an emergency.

According to yet another advantageous development of the energy chain device, it is proposed that the drive device comprises at least one driven roller. The roller is in contact with the moved strand such that the rotation of the roller is converted into a rectilinear movement of the moved strand.

According to yet another advantageous development of the energy chain device according to the invention, it is proposed that the drive device comprises at least one driven endless belt. The endless belt can be formed, for example, in the manner of a chain or belt conveyor.

The drive device preferably comprises an electric motor.

In order to introduce the forces into the energy chain in a substantially uniform manner, it is proposed that several drive devices which are arranged spaced apart from one another are provided along a travel path of the movable strand.

It is also possible to provide a driven vehicle, on which the moved strand is placed, between the strands.

According to yet another advantageous development, it is proposed that at least some links are realized with at least one drive device.

For the lateral stability of the energy chain along travel paths, it is proposed that a guide channel is provided. At least one portion of a strand, in particular of the movable strand, is guided in the guide channel. The drive devices are preferably arranged in the region of the guide channel.

Figure 2:
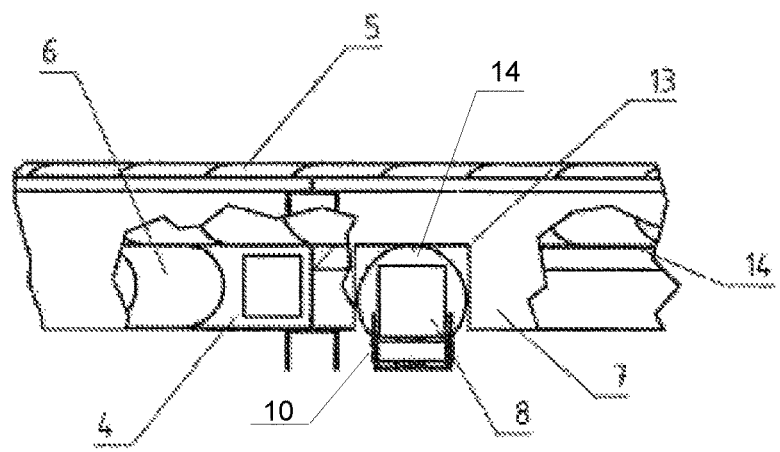
Figure 3:
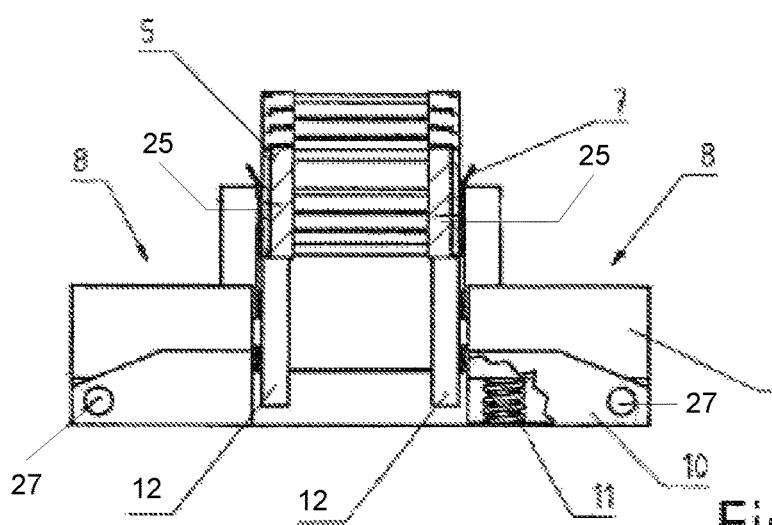
Figure 4:
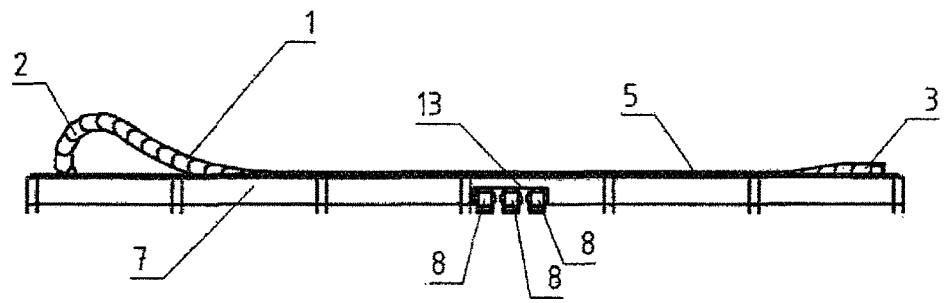
Figure 5:
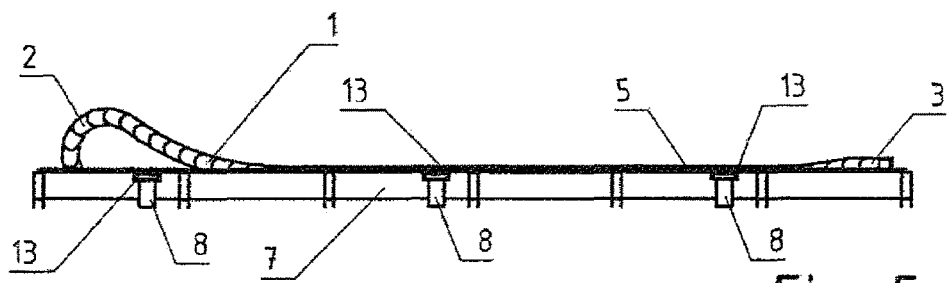
Figure 6:
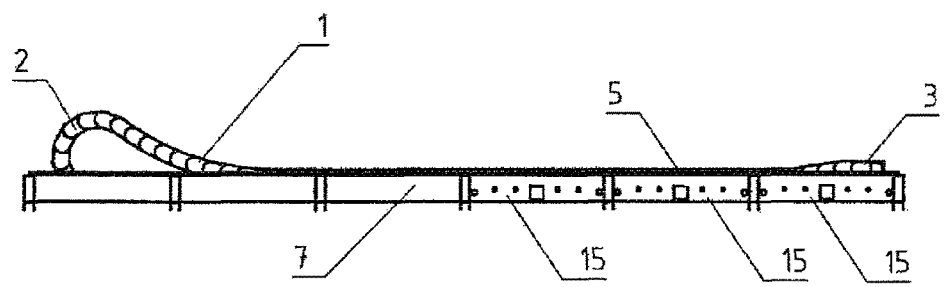
Figure 7:
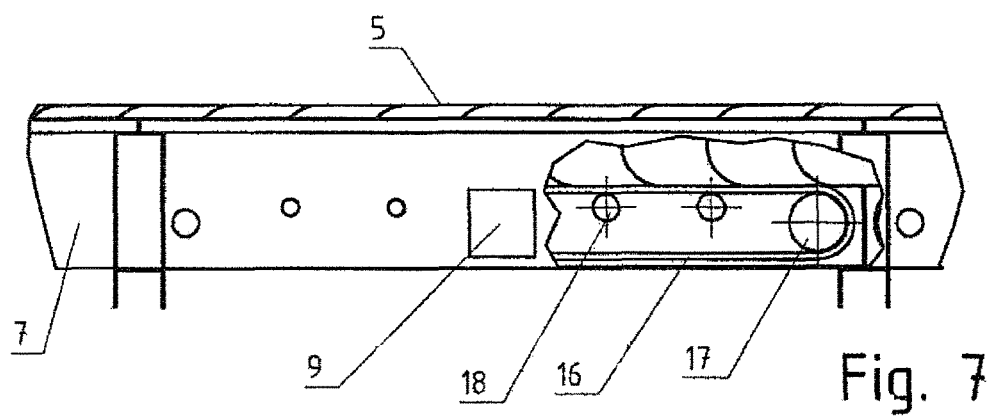
Figure 8:
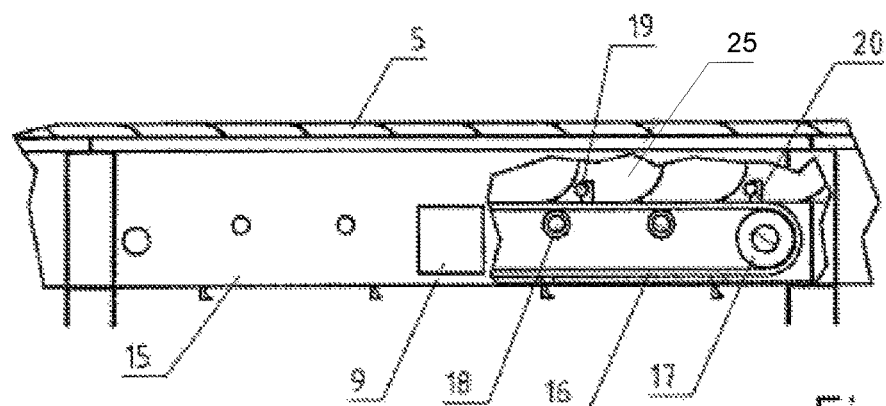
Figure 9:
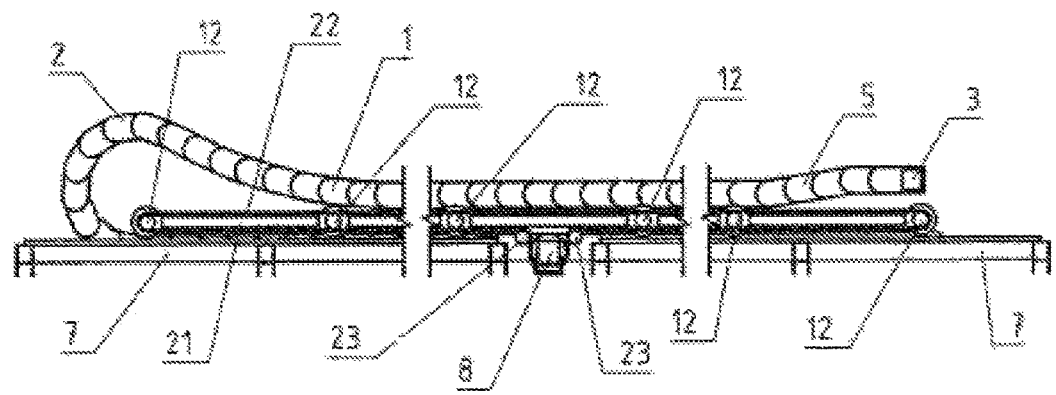
Figure 10:
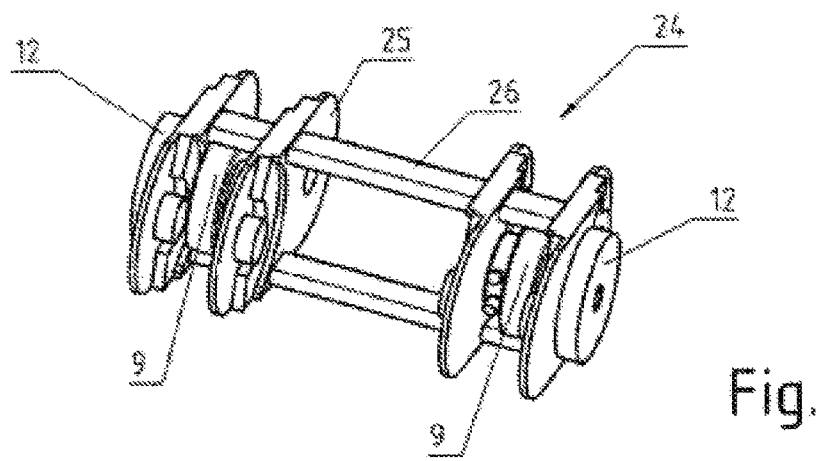
Figure 11:
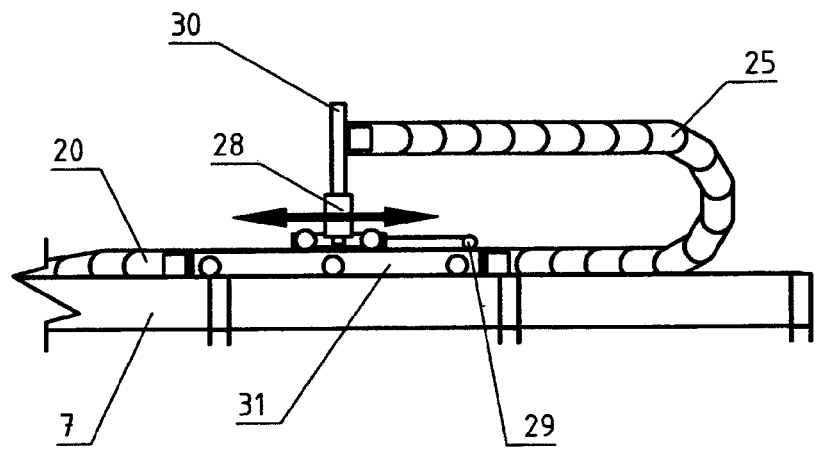
Figure 12:
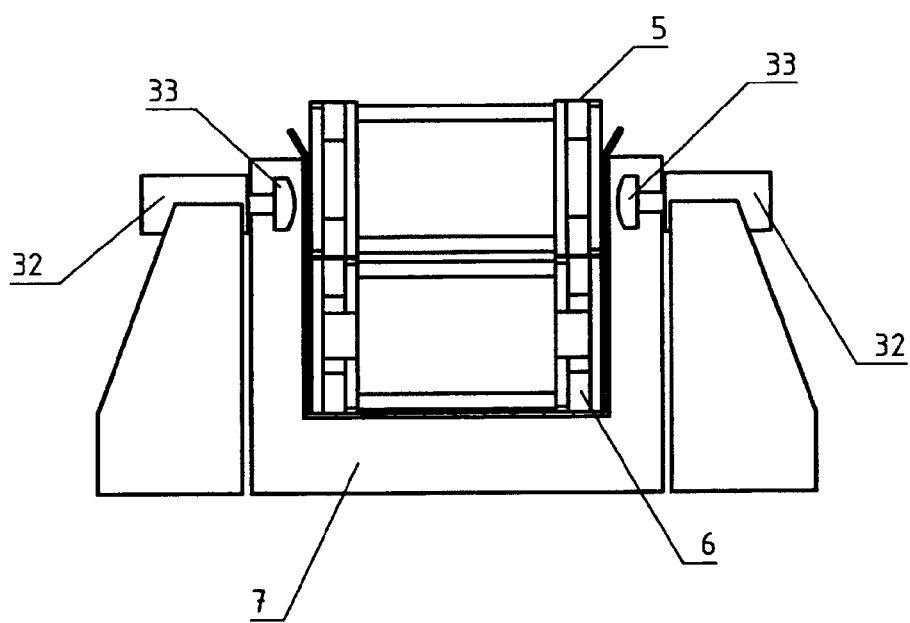

Further advantages and details of the invention are explained by way of the exemplary embodiments shown in the drawing without the object of the invention being limited by said concrete exemplary embodiments. The drawings are as follows:

FIG. 1 shows a schematic representation of a front view of an energy chain device, FIG. 2 shows a front view of a detail of the energy chain device according to FIG. 1, FIG. 3 shows a side view of a detail of the energy chain device according to FIG. 1, FIG. 4 shows a front view of a second exemplary embodiment of an energy chain device, FIG. 5 shows a schematic representation and front view of a third exemplary embodiment of an energy chain device, FIG. 6 shows a front view of a fourth exemplary embodiment of an energy chain device, FIG. 7 shows a view of a detail of the energy chain device according to FIG. 6, FIG. 8 shows a modified embodiment of the energy chain device according to FIG. 6, FIG. 9 shows a fifth exemplary embodiment of an energy chain device with an intermediate vehicle, FIG. 10 shows a link of an energy chain with a drive device, FIG. 11 shows a schematic representation of an energy chain device with a coupling device and FIG. 12 shows a schematic representation of an energy chain device with a braking device.

FIG. 1 shows a schematic representation of a first exemplary embodiment of an energy chain device. The energy chain device comprises an energy chain 1. The energy chain 1 is formed by links 24. The links 24 are connected together in a flexible manner. The energy chain 1 is arranged in a guide channel 7 in the exemplary embodiment shown. The energy chain 1 is movable between a fixed and a movable connection region. An entrainment connection is designated by way of the reference numeral 3. The energy chain 1 comprises a curved region 2 which is formed between a moved strand 5 and a stationary strand 6 which lies in the guide channel 7. Several drive devices 8 are provided along the travel path spaced apart from one another. The drive devices 8 are operatively connected to the moved strand 5. A control unit 40 which is connected to the drive device 8 so as to transmit signals is not shown in FIG. 1. In addition, FIG. 1 shows a device 42 which is connectable to the entrainment connection 3. The control device of the device 42 is connected to the control unit 40 so as to transmit signals.

It can be seen from the representation according to FIGS. 2 and 3 that the drive device 8 comprises a drive motor 9. The drive motor 9 is an electrically actuatable motor. It comprises a roller 12 which is driven by the drive motor 9. It can be seen from the representation according to FIG. 3 that the drive rollers 12 of the operating devices 8, which are arranged on both sides of the guide channel 7, are operatively connected to the moved strand 5. In this connection, the link plates 25 rest on the rollers 12. If the drive device 8 is actuated, the moved strand 5 moves in dependence of the direction of rotation of the rollers.

The drive motor 9 is positionable so as to be pivotable about an axis 27. A pressing spring 11, which is realized as a compression spring, is provided adjacent the guide channel 7. The drive motor 9 can be pressed up in the direction of the moved strand 5 by the compression spring. The load of the moved strand 5 acts in the reverse direction onto the pressing spring 9 such that an operative connection between the rollers 12 and the upper strand 5 is always ensured. The axis 27 extends through a motor support bracket 10 which is realized in a substantially U-shaped manner.

In dependence on the direction of movement of the entrainment connection 3, the rollers 12 are rotated in the corresponding direction such that the moved strand 5 is able to be moved by means of the drive devices 8.

The drive devices 8 are arranged in a train end position between a fixed point connection (not shown) of the energy chain 1 and the entrainment connection 3. In the train end position, the entire movable strand of the energy chain 1 rests on gliding surfaces 14 of the guide channel 7 and the rollers 12.

It can be seen from the representation according to FIG. 2 that recesses 13, through which the rollers 12 extend at least in part into the guide channel 7, are provided in the side walls of the guide channel 7. No gliding surfaces 14 are provided in the region of the recesses. FIG. 2 shows the fixed-point connection 4 of the energy chain. The stationary strand 6 connects to the fixed-point connection 4.

The drive devices 8 are preferably connected to a control unit (not shown). The control unit receives, from a control device (not shown) of a device which is connectable to the movable entrainment connection 3, signals concerning the direction of travel and the travel path such that corresponding activation of the drive devices 8 is possible.

A control unit which is connected to a sensor unit can be provided as an alternative to this, the sensor unit detecting the movement of the movable connection region 3. The control unit then actuates the drive devices 8 in dependence on the direction of travel and the travel path. The sensor unit can be a pressure sensor unit, for example.

FIG. 4 shows a second exemplary embodiment of an energy chain device. The development of the energy chain device according to FIG. 4 corresponds substantially to the development according to FIGS. 1 to 3, in the exemplary embodiment according to FIG. 4 the drive devices 8 being arranged substantially adjacent the fixed-point connection 4.

FIG. 5 shows a third exemplary embodiment of an energy chain device. The principal design of the energy chain device corresponds to the design of the first exemplary embodiment according to FIGS. 1 to 3. In the third exemplary embodiment according to FIG. 5, the drive devices 8 are arranged distributed over the entire length of the guide channel 7. The drive devices 8 comprise rollers which act on the moved strand 5 on the outside surfaces of the link plates according to the principle of a friction wheel drive.

FIGS. 6 and 7 show a fourth exemplary embodiment of an energy chain device. The energy chain device comprises an energy chain 1 which is arranged in a guide channel 7. Several drive devices 15 are arranged inside the guide channel 7. The drive devices 15 comprise a drive motor 9 with a roller (not shown). A guide roller 17 is provided at a spacing from the drive motor 9. An endless belt 16 is driven by means of the drive motor 9. The movable strand 5 of the energy chain rests on the endless belt 16. Support rollers 18 are provided to support the endless belt 16. The drive motor 9 is connected to a control device (not shown).

A modification of the exemplary embodiment of an energy chain device shown in FIGS. 6 and 7 is shown in FIG. 8. The endless belt 16 is provided with entrainment means 20. Entrainment bolts 19, which can be entrained by the entrainment means 20, are provided on the two link plates 25 of the links of the movable strand 5. The energy chain is advanced as a result.

FIG. 9 shows yet another exemplary embodiment of an energy chain device. In the exemplary embodiment shown, an intermediate vehicle 21 is arranged between the movable strand 5 and the stationary strand 6. The intermediate vehicle 21 is movable along the stationary strand. A drive device which comprises a drive 9 is provided for this purpose. The drive motor 9 drives for example a roller chain or a toothed belt 22. The toothed belt 22 is guided by the guide rollers 23 about a driving pulley (not shown) which is driven by the drive motor 9. The toothed belt 22 drives the rollers 12. The intermediate vehicle 21 is moved at half the speed of the entrainment connection 3.

A development of a chain link 24 can be seen from FIG. 10. The chain link 24 is formed by link plates 25 and transverse webs 26 which connect said link plates. A drive motor 9 which forms the drive device is arranged directly on the link plates 25. The drive motor 9 drives the rollers 12 which roll along a rack (not shown). The connecting lines for the drive motor 9 can be guided in the energy chain that is formed by the links 24. It is also possible for the drive device not to be arranged on the link plates 25, but on the transverse webs 26.

FIG. 11 shows a schematic representation of an energy chain device with a coupling device 28. The coupling device 28 comprises a guide and a guide part which is connected to an entrainment means 30 of a device (not shown). The coupling device 28 has at least one sensor 29 which can be a path sensor, for example. The coupling device 28 is connected to the entrainment means 20 of the energy chain device in the movable connection region 31. In addition, the coupling device 28 is connected to a portion of an energy chain device. This is not absolutely necessary. The entrainment means 30 is movable back and forth in the direction of the arrow. In dependence on the travel path of the entrainment means, the sensor 29 supplies a signal to the control unit (not shown), by means of which the at least one drive device and/or the braking device is/are activated or deactivated.

An exemplary embodiment of a braking device 32 is shown in FIG. 12. The braking device 32 comprises a brake shoe 33 which can be moved to abut against a link of the energy chain device. The braking device can be actuatable in a pneumatic, hydraulic or electric manner. Oppositely situated pairs of braking devices 32 are preferably provided.

LIST OF REFERENCES

1 Energy chain
2 Curved region
3 Entrainment connection
4 Fixed-point connection
5 Movable strand
6 Stationary strand
7 Guide channel
8 Drive device
9 Drive motor
10 Motor support bracket
11 Pressing spring
12 Rollers
13 Recess
14 Gliding surface
15 Drive device
16 Endless belt
17 Guide roller
18 Support rollers
19 Entrainment bolt
20 Entrainment means
21 Intermediate vehicle
22 Roller chain/toothed belt
23 Guide roller
24 Link
25 Chain flap
26 Transverse web
27 Axis
28 Coupling device
29 Sensor 30 Entrainment means
31 Movable connection region
32 Braking device
33 Brake shoe
40 Control unit
42 Device having control device

The invention claimed is:

1. An energy chain device, comprising:
at least one energy chain for guiding lines, cables, or hoses between a fixed and a movable connection region so as to form a curved region between a movable strand and a stationary strand, each energy chain having a number of links which are connected to one another flexibly and are formed by link plates which are arranged parallel to one another and transverse webs which connect said link plates,
at least one drive device which is operatively connected to the movable strand, and
a control unit which is connected to the drive device so as to transmit signals and is connectable so as to transmit signals to a control device of a device which is connectable to the movable connection region;
wherein several drive devices which are spaced apart from one another are arranged along a travel path of the movable strand.

2. The energy chain device as claimed in claim 1, further comprising:
a sensor unit which is connected to the control unit so as to transmit signals, wherein the sensor unit detects a movement of the movable connection region.

3. The energy chain device as claimed in claim 1, wherein there is provided a coupling device, by means of which the movable connection region is detachably connectable to an entrainment means of a device.

4. The energy chain device as claimed in claim 3, wherein the movable connection region and the entrainment means are movable relative to one another inside a predefined section of the at least one energy chain.

5. The energy chain device as claimed in claim 1, wherein the drive device comprises at least one driven roller.

6. The energy chain device as claimed in claim 1, wherein the drive device comprises at least one driven endless belt.

7. The energy chain device as claimed in claim 1, wherein the drive device comprises an electric drive motor.

8. The energy chain device as claimed in claim 1, wherein at least some links are in communication with at least one drive device.

9. The energy chain device as claimed in claim 1, wherein at least one portion of the movable strand is guided in a guide channel.

10. The energy chain device as claimed in claim 1, wherein the drive device is a braking device.

11. The energy chain device as claimed in claim 1, wherein at least one braking device is provided.

* * * * *